United States Patent
Karasawa

(10) Patent No.: US 10,511,819 B2
(45) Date of Patent: Dec. 17, 2019

(54) IMAGE PROJECTION SYSTEM, PROJECTOR, AND METHOD FOR CONTROLLING IMAGE PROJECTION SYSTEM

(71) Applicant: SEIKO EPSON CORPORATION, Tokyo (JP)

(72) Inventor: Yukihiro Karasawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/299,896

(22) Filed: Mar. 12, 2019

(65) Prior Publication Data
US 2019/0289266 A1  Sep. 19, 2019

(30) Foreign Application Priority Data
Mar. 13, 2018 (JP) ................ 2018-045074

(51) Int. Cl.
H04N 9/31 (2006.01)
H04N 5/067 (2006.01)

(52) U.S. Cl.
CPC ........... *H04N 9/3194* (2013.01); *H04N 5/067* (2013.01)

(58) Field of Classification Search
CPC .. H04N 9/3194; H04N 9/3197; H04N 9/3129; H04N 9/3141; H04N 9/31; H04N 5/067; H04N 5/06; H04N 5/0675; G06F 3/0425
USPC ................ 348/522, 500, 744–747; 345/175
See application file for complete search history.

(56) References Cited

U.S. PATENT DOCUMENTS

2015/0205345 A1  7/2015  Naess et al.
2017/0237955 A1*  8/2017  Koyama ............. H04N 9/3194
                                                        348/745

FOREIGN PATENT DOCUMENTS

JP  2015-114719 A  6/2015
JP  2015-158887 A  9/2015
JP  2016-186677 A  10/2016

* cited by examiner

Primary Examiner — Sherrie Hsia
(74) Attorney, Agent, or Firm — Oliff PLC

(57) ABSTRACT

An image projection system includes a projector and a pointing element. The projector includes: an image projection unit which projects an image; an image pickup unit; a detection unit which detects a pointed position of the pointing element, based on an image picked up by the image pickup unit; a synchronization signal transmission unit which transmits a synchronization signal to the pointing element; a screen size acquisition unit which acquires a screen size of the image projected from the image projection unit; and a synchronization signal adjustment unit which sets a light emission intensity of the synchronization signal to a first intensity if the acquired screen size is a first size and which sets the light emission intensity of the synchronization signal to a second intensity that is lower than the first intensity if the acquired screen size is a second size that is smaller than the first size.

14 Claims, 11 Drawing Sheets

IMAGE PROJECTION SYSTEM, PROJECTOR, AND METHOD FOR CONTROLLING IMAGE PROJECTION SYSTEM

BACKGROUND

1. Technical Field

The present invention relates to an image projection system, a projector, and a method for controlling an image projection system.

2. Related Art

A projector which projects an image (projection image) onto a projection surface and which can pick up an image of light emitted from a pointing element such as a light pen and detect a position (pointed position) pointed by the pointing element within the projection image is known (see, for example, JP-A-2015-158887). The projector disclosed in JP-A-2015-158887 repeatedly transmits an infrared synchronization signal to the pointing element. The pointing element repeatedly emits light at a timing synchronized with the received synchronization signal. In some cases, the projector projects a projection image with a large screen size and therefore needs to transmit the synchronization signal with a high enough intensity for the pointing element to be able to receive the synchronization signal over the entire area of the projection image.

However, increasing the intensity of the synchronization signal transmitted from the projector causes the pointing element to receive the synchronization signal even at a position sufficiently away from a projection image projected with a relatively small screen size by the projector. That is, the pointing element emits light synchronously with the received synchronization signal even when not pointing in the projection image. This poses the problem of unwanted consumption of electric power.

SUMMARY

An image projection system according to an aspect of the invention includes a projector and a pointing element. The projector includes: an image projection unit which projects an image; an image pickup unit; a detection unit which detects a pointed position of the pointing element, based on an image picked up by the image pickup unit; a synchronization signal transmission unit which transmits a synchronization signal to the pointing element; a screen size acquisition unit which acquires a screen size of the image projected from the image projection unit; and a synchronization signal adjustment unit which sets an intensity of the synchronization signal to a first intensity if the acquired screen size is a first size and which sets the intensity of the synchronization signal to a second intensity that is lower than the first intensity if the acquired screen size is a second size that is smaller than the first size. The pointing element includes: a light emitting unit; a synchronization signal receiving unit which receives the synchronization signal; and a control unit which controls light emission of the light emitting unit, based on the synchronization signal received by the synchronization signal receiving unit.

In the image projection system, it is desirable that the screen size acquisition unit of the projector causes the image projection unit to project a predetermined pattern image, causes the image pickup unit to pick up the projected pattern image, and calculates the screen size, based on the picked-up pattern image.

In the image projection system, it is desirable that the synchronization signal transmission unit of the projector periodically transmits a first synchronization signal having an intensity adjusted by the synchronization signal adjustment unit and a second synchronization signal having an intensity lower than that of the first synchronization signal, and that the control unit of the pointing element causes the light emitting unit to emit light, based on the first synchronization signal received by the synchronization signal receiving unit, and adjusts an amount of light emitted from the light emitting unit, based on a result of reception of the second synchronization signal by the synchronization signal receiving unit.

In the image projection system, it is desirable that if the synchronization signal receiving unit receives the second synchronization signal, the control unit of the pointing element reduces the amount of light emitted from the light emitting unit to less than the amount of light emitted where the synchronization signal receiving unit does not receive the second synchronization signal.

In the image projection system, it is desirable that the second synchronization signal is a signal with an intensity decreasing with the lapse of time, and that the control unit of the pointing element makes the amount of light emitted from the light emitting unit smaller as a duration of the second synchronization signal received by the synchronization signal receiving unit becomes longer.

A projector according to another aspect of the invention includes: an image projection unit which projects an image; an image pickup unit; a detection unit which detects a pointed position of a pointing element, based on an image picked up by the image pickup unit; a synchronization signal transmission unit which transmits a synchronization signal to the pointing element; a screen size acquisition unit which acquires a screen size of the image projected from the image projection unit; and a synchronization signal adjustment unit which sets an intensity of the synchronization signal to a first intensity if the acquired screen size is a first size and which sets the intensity of the synchronization signal to a second intensity that is lower than the first intensity if the acquired screen size is a second size that is smaller than the first size.

A method for controlling an image projection system according to still another aspect of the invention is a method for controlling an image projection system including a projector which projects an image and a pointing element having a light emitting unit. The method includes: causing the projector to acquire a screen size of the projected image, to transmit a synchronization signal with a first intensity to the pointing element if the acquired screen size is a first size, and to transmit the synchronization signal with a second intensity that is lower than the first intensity if the acquired screen size is a second size that is smaller than the first size; causing the pointing element to receive the synchronization signal and to cause the light emitting unit to emit light, based on the received synchronization signal; and causing the projector to pick up an image of the light emitted from the light emitting unit and to detect a pointed position of the pointing element.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
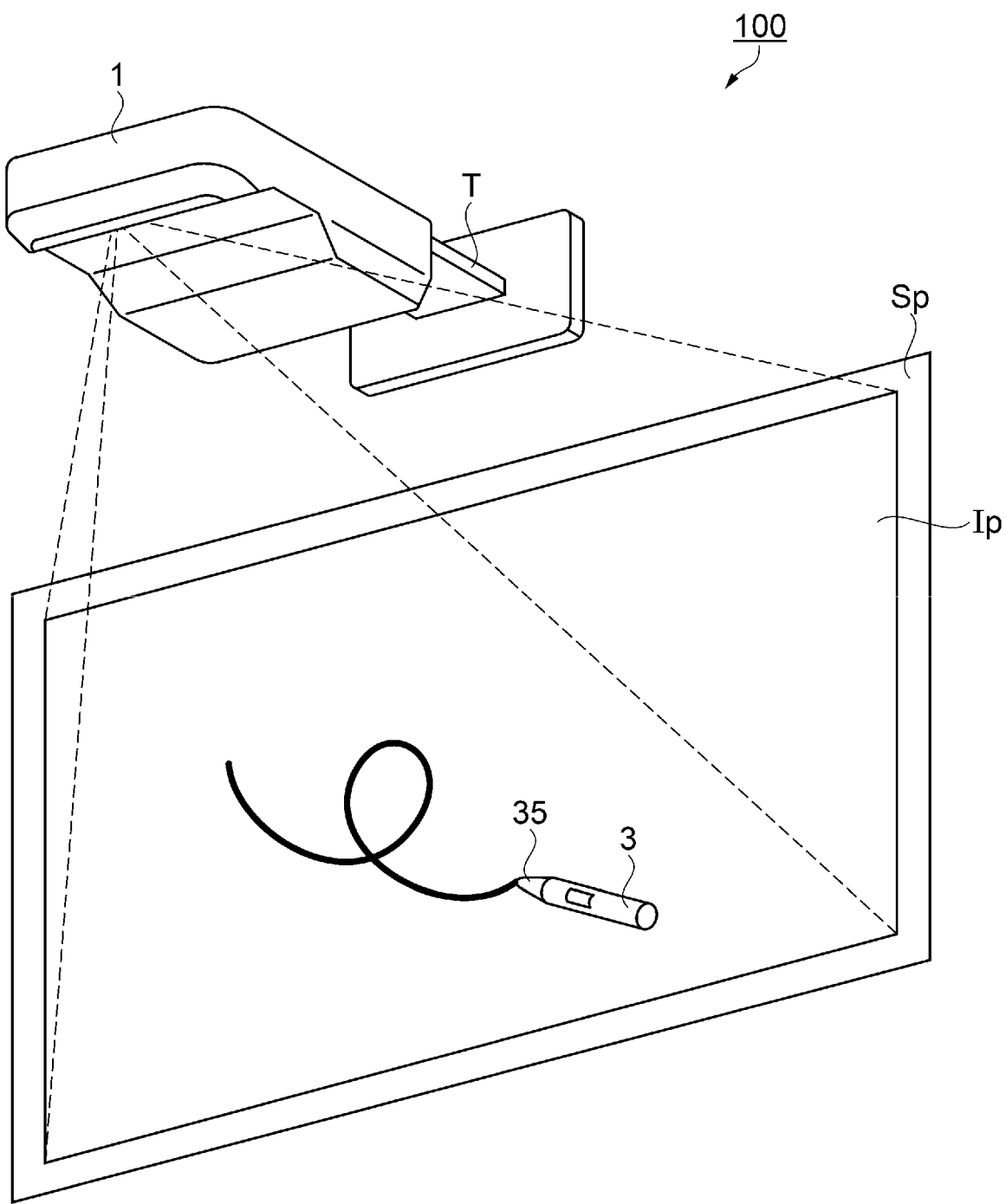
FIG. 1 is a perspective view showing an image projection system.

Hereinafter, an image projection system according to a first embodiment will be described with reference to the drawings. FIG. 1 is a perspective view showing an image projection system 100 according to this embodiment. As shown in FIG. 1, the image projection system 100 has a projector 1 as an image display device and a light pen 3 as a pointing element. The projector 1 projects an image based on image information inputted from outside or image information stored inside in advance, onto a projection surface Sp as a display surface. The projector 1 in this embodiment is fixed to a wall surface via a fastening member T and projects an image toward the projection surface Sp arranged along the same wall surface. The projection surface Sp can be, for example, a screen or whiteboard. However, an image may be projected on the wall surface itself.

The projector 1 can also pick up an image over a range including an image projected on the projection surface Sp (hereinafter also referred to as a "projection image Ip"). The projector 1 picks up an image of infrared light emitted from a light emitting unit 35 at the distal end of the light pen 3 and detects a position (pointed position) pointed by the light pen 3 within the projection image Ip. The projector 1 can then display a pointer at the detected pointed position in a superimposed manner or display an image such as a line drawn along the trajectory of the pointed position (hereinafter also referred to as a "drawn image") in a superimposed manner. While the light pen 3 in this embodiment emits infrared light, the light pen 3 may emit light in other wavelength ranges.

Figure 2:
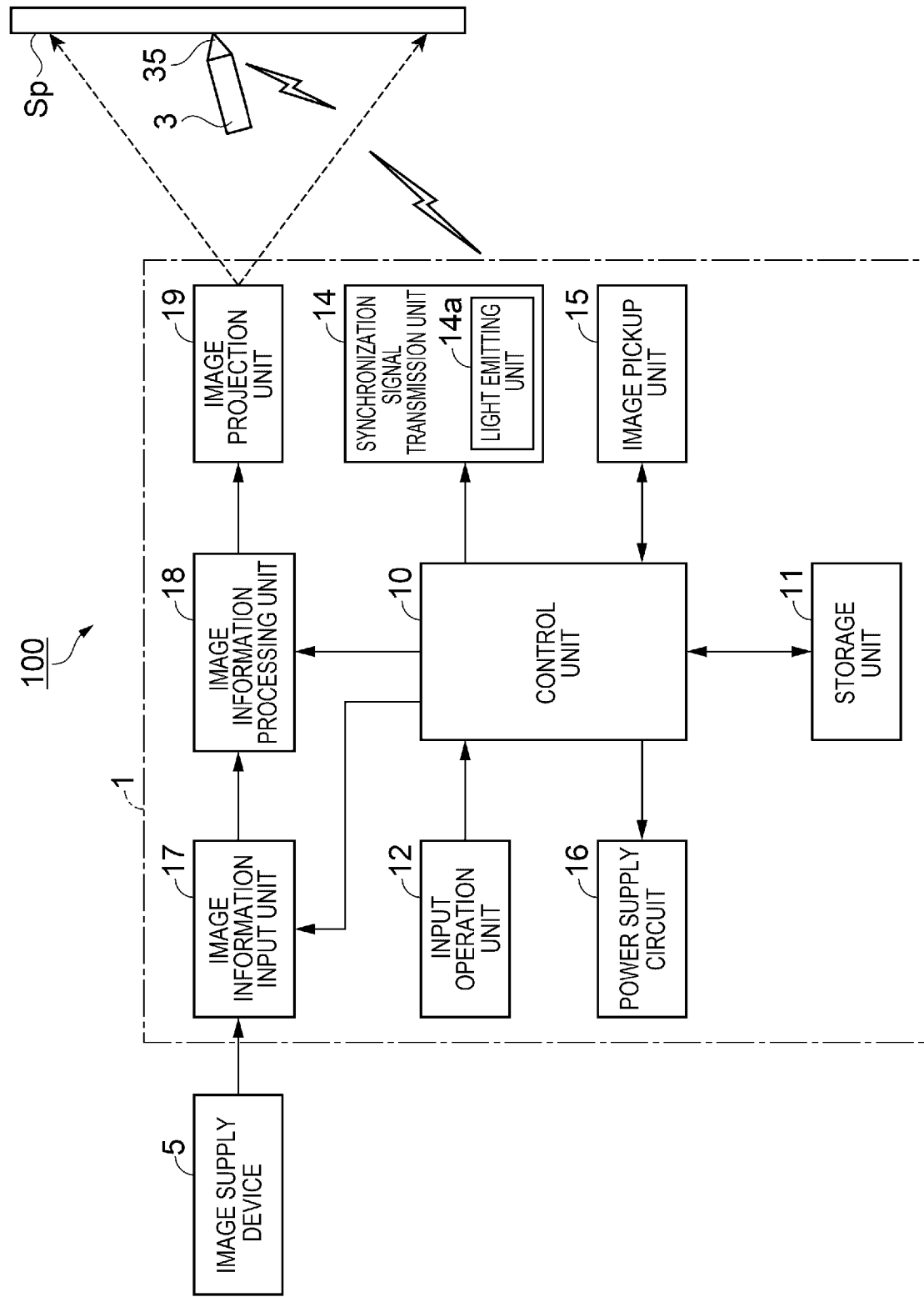
FIG. 2 is a block diagram showing a schematic configuration of a projector.
Figure 3:
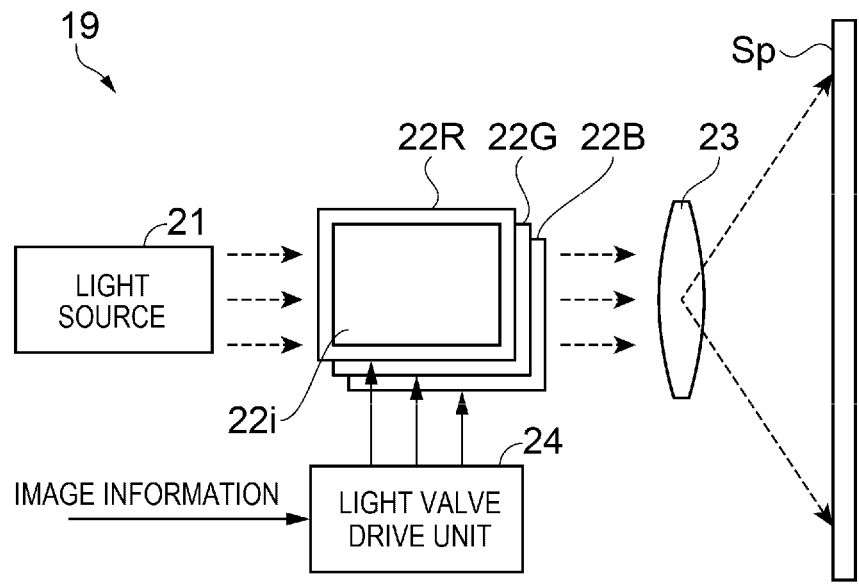
FIG. 3 is a block diagram showing a schematic configuration of an image projection unit.

FIG. 2 is a block diagram showing a schematic configuration of the projector 1. FIG. 3 is a block diagram showing a schematic configuration of an image projection unit 19 of the projector 1.

As shown in FIG. 2, the projector 1 has a control unit 10, a storage unit 11, an input operation unit 12, a synchronization signal transmission unit 14, an image pickup unit 15, a power supply circuit 16, an image information input unit 17, an image information processing unit 18, and an image projection unit 19, which are provided in a unified manner. The projector 1 projects an image onto the projection surface Sp from the image projection unit 19, based on image information inputted to the image information input unit 17.

The control unit 10 has one or a plurality of processors and operates according to a control program stored in the storage unit 11, thus comprehensively controlling operations of the projector 1.

The storage unit 11 has a memory such as a RAM (random access memory) and a ROM (read-only memory). The RAM is used to temporarily store various data or the like. The ROM stores the control program and control data or the like to control operations of the projector 1. The storage unit 11 may also store image information to be projected from the image projection unit 19.

The input operation unit 12 has a plurality of operation keys for a user to give various instructions to the projector 1. The operation keys provided on the input operation unit 12 include a "power key" to switch the power between on and off (standby), a "menu key" to display a menu image for various settings, a "direction key" to select an item on the menu image, and the like. As the user operates the various operation keys on the input operation unit 12, the input operation unit 12 outputs an operation signal corresponding to the content of the operation by the user, to the control unit 10. Also, a remote controller (not illustrated) that can perform remote control may be used as the input operation unit 12. In this case, the remote controller sends an infrared operation signal corresponding to the content of the operation by the user. A remote control signal receiving unit, not illustrated, receives this operation signal and transmits the operation signal to the control unit 10.

The synchronization signal transmission unit 14 has a light emitting unit 14a to transmit a signal for synchronization (synchronization signal) to the light pen 3. As the light source of the light emitting unit 14a, for example, an LED (light emitting diode) which emits infrared light is used. The synchronization signal transmission unit 14 causes the light emitting unit 14a to periodically emit light under the control of the control unit 10 and transmits an infrared synchronization signal to the light pen 3. The light pen 3 periodically receives this synchronization signal and causes the light emitting unit 35 to repeatedly emit light at a timing synchronized with the received synchronization signal.

The image pickup unit 15 is a camera having an image pickup element (not illustrated) such as a CCD (charge-coupled device) sensor or a CMOS (complementary metal-oxide semiconductor) sensor. The image pickup unit 15 has an infrared transmission filter absorbing visible light and transmitting infrared light and picks up an image of infrared light emitted from the light pen 3, via this infrared transmission filter. The image pickup unit 15 picks up an image over a range including the projection image Ip on the projection surface Sp under the control of the control unit 10 and outputs image information (picked-up image information), which is the result of the image pickup, to the control unit 10. The control unit 10 causes the image pickup unit 15 to pick up an image at a timing synchronized with the synchronization signal transmitted from the synchronization signal transmission unit 14. That is, the image pickup unit 15 repeats image pickup in accordance with the timing when the light pen 3 emits light.

The image pickup unit 15 can also temporarily withdraw the infrared transmission filter from the optical path under the control of the control unit 10. With the infrared transmission filter withdrawn, the image pickup unit 15 can pick up an image of visible light.

The power supply circuit 16 is supplied with mains electricity (not illustrated) of AC 100 V or the like from outside. The power supply circuit 16 converts mains electricity (AC power supply) to a DC power supply of a predetermined voltage and supplies electric power to each part of the projector 1 (the supply route to each part is not illustrated). The control unit 10 can control the power supply circuit 16 to start and stop supplying electric power to each part.

The image information input unit 17 is connected to an external image supply device 5 such as a computer or image playback device and receives image information supplied from the image supply device 5. The image information input unit 17 can also be supplied with image information stored in the storage unit 11, from the control unit 10. The image information input unit 17 outputs the inputted image information to the image information processing unit 18.

The image information processing unit 18, under the control of the control unit 10, performs various kinds of processing on the image information inputted from the image information input unit 17 and outputs the processed image information to a light valve drive unit 24 (see FIG. 3) of the image projection unit 19. For example, the image information processing unit 18 performs processing to adjust image quality such as brightness and contrast, processing to correct a distortion of the image, processing to superimpose an OSD (on-screen display) image such as a drawn image or menu image, and the like, on the image information according to need.

The image information input unit 17 and the image information processing unit 18 may be made up of one or a plurality of processors or the like, or may be made up of a dedicated processing device such as an ASIC (application specific integrated circuit) or FPGA (field-programmable gate array).

As shown in FIG. 3, the image projection unit 19 has a light source 21, three liquid crystal light valves 22R, 22G, 22B as light modulation devices, a projection system 23, and a light valve drive unit 24 or the like. In the image projection unit 19, the liquid crystal light valves 22R, 22G, 22B modulate light emitted from the light source 21 and thus form image light, and the projection system 23 including at least one of a lens and a mirror projects the image light to display an image on the projection surface Sp.

The light source 21 includes a discharge-type light source lamp such as an ultra-high-pressure mercury lamp or metal halide lamp, or a solid-state light source such as a light-emitting diode or semiconductor laser. The light emitted from the light source 21 is converted into light with substantially uniform luminance distribution by an optical integration system, not illustrated. The light is then separated into individual color light components of red (R), green (G), and blue (B) by a color separation system, not illustrated. The individual color light components become incident on the corresponding liquid crystal light valves 22R, 22G, 22B.

Each of the liquid crystal light valves 22R, 22G, 22B is made up of a transmission-type liquid crystal panel having a pair of transparent substrates with a liquid crystal enclosed between them. On each liquid crystal panel, a rectangular image forming area 22i made up of a plurality of pixels arranged into a matrix is formed. A drive voltage can be applied to the liquid crystal at each pixel.

The light valve drive unit 24 forms an image in the image forming area 22i of the liquid crystal light valves 22R, 22G, 22B. Specifically, the light valve drive unit 24 applies a drive voltage corresponding to image information inputted from the image information processing unit 18, to each pixel in the image forming area 22i, and thus sets each pixel to a light transmittance corresponding to the image information. The light emitted from the light source 21 is transmitted through the image forming area 22i of the liquid crystal light valves 22R, 22G, 22B and thus modulated at each pixel. Image light corresponding to the image information is thus formed for each color light component. The resulting image lights of the individual colors are combined at each pixel by a light combining system, not illustrated, and thus form image light representing a color image. The image light is then projected in an enlarged manner on the projection surface Sp by the projection system 23. Consequently, the projection image Ip (see FIG. 1) based on the image information inputted to the image information input unit 17 is displayed on the projection surface Sp.

Figure 4:
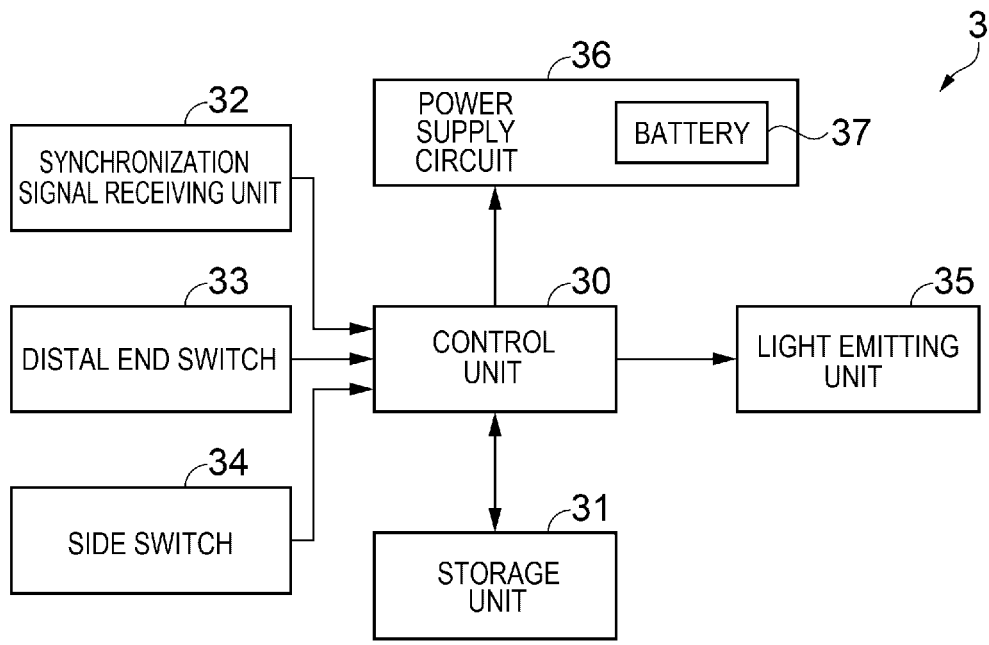
FIG. 4 is a block diagram showing a schematic configuration of a light pen.

FIG. 4 is a block diagram showing a schematic configuration of the light pen 3.

As shown in FIG. 4, the light pen 3 has a control unit 30, a storage unit 31, a synchronization signal receiving unit 32, a distal end switch 33, a side switch 34, a light emitting unit 35, and a power supply circuit 36. The power supply circuit 36 includes a battery 37.

The control unit 30 has one or a plurality of processors. The control unit 30 operates according to a control program stored in the storage unit 31 and thus comprehensively controls operations of the light pen 3.

The storage unit 31 is made up of a memory which stores the control program and control data or the like for controlling operations of the light pen 3.

The synchronization signal receiving unit 32 is made up of a light receiving element or the like which receives infrared light. The synchronization signal receiving unit 32 receives an infrared synchronization signal transmitted periodically from the synchronization signal transmission unit 14 of the projector 1, converts the infrared synchronization signal into an electrical signal, and outputs the electrical signal to the control unit 30.

The distal end switch 33 is arranged at a distal end part (tip) of the light pen 3. When an operation of pressing the distal end part against the projection surface Sp is carried out or the like, the distal end switch 33 detects the pressing of the distal end part and outputs the result of the detection to the control unit 30.

The side switch 34 detects an operation (pressing) by the user on an operation button arranged on the lateral side of the light pen 3 and outputs the result of the detection to the control unit 30.

The light emitting unit 35 has a light source (for example, LED) arranged near the distal end part of the light pen 3 and emits infrared light under the control of the control unit 30. The control unit 30 causes the light emitting unit to repeatedly emit light synchronously with the synchronization signal received periodically by the synchronization signal receiving unit 32.

The power supply circuit 36 has the battery 37. The power supply circuit 36 converts DC power supplied from the battery 37 into a predetermined voltage and supplies electric power to each part of the light pen 3 (the supply route to each part is not illustrated). The control unit 30 can control the power supply circuit 36 to start and stop supplying electric power to each part. The battery 37 is, for example, a primary battery accommodated in a replaceable manner and supplies electric power to the power supply circuit 36. Also, a rechargeable secondary battery may be employed as the battery 37.

The control unit 30 controls the power supply from the power supply circuit 36 to the synchronization signal receiving unit 32 and thus can switch between a receiving state where the synchronization signal receiving unit 32 receives a synchronization signal and a non-receiving state where the synchronization signal receiving unit 32 does not receive a synchronization signal. For example, if the light pen 3 has a grip detection unit (not illustrated) which detects that the light pen 3 is gripped by the user, the control unit 30 set the synchronization signal receiving unit 32 into the receiving state when a gripping by the user is detected. In the receiving state, when the synchronization signal receiving unit 32 receives a synchronization signal, the control unit 30 executes processing to cause the light emitting unit 35 to emit light synchronously with the received synchronization signal, or the like.

Figure 5:
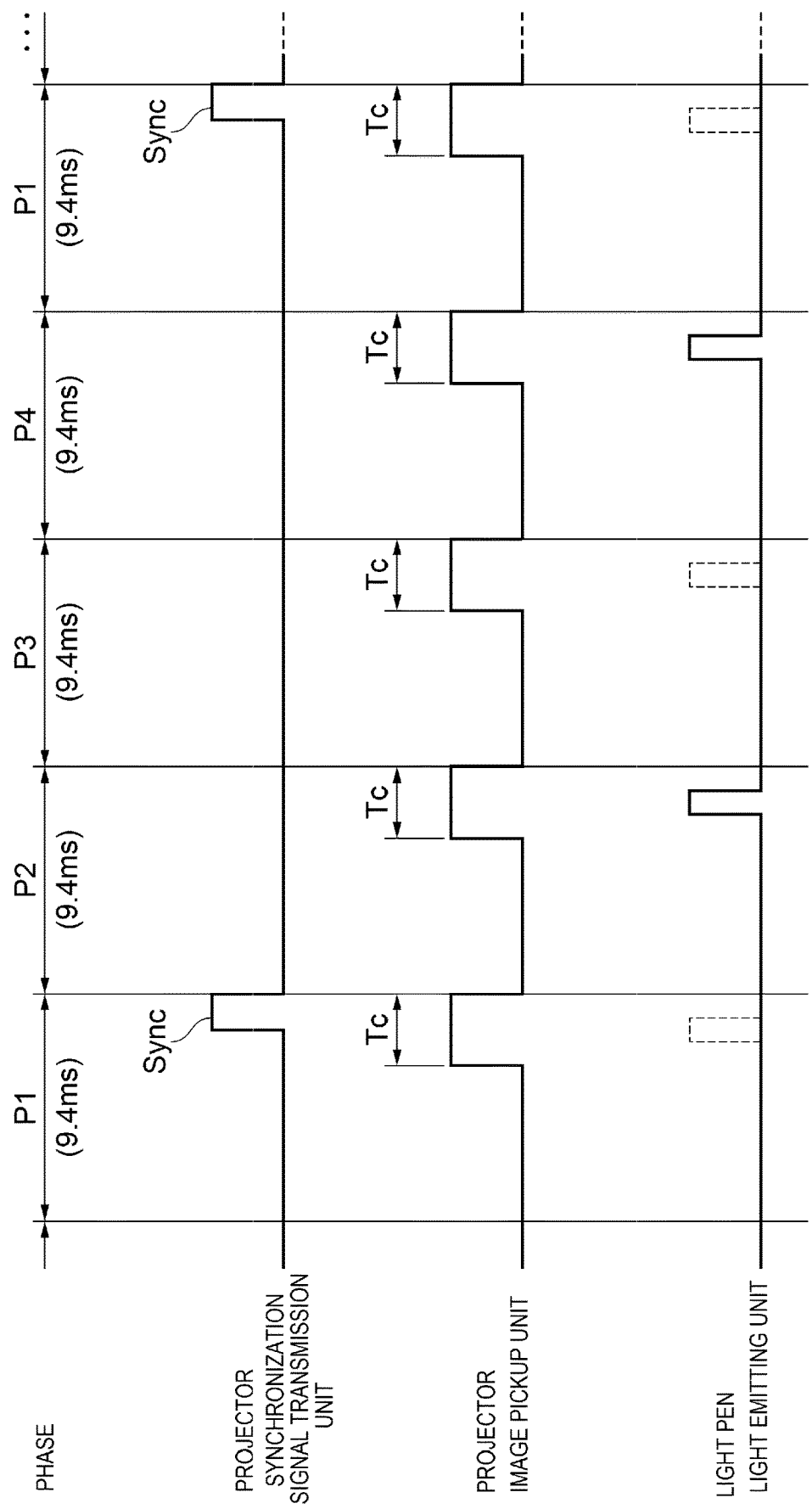
FIG. 5 is a timing chart showing operation timings of the image projection system.

FIG. 5 is a timing chart showing operation timings of the image projection system 100 and showing, from the top, the timing when the synchronization signal transmission unit 14 of the projector 1 transmits a synchronization signal Sync (emits light), the timing when the image pickup unit 15 of the projector 1 performs image pickup, and the timing when the light emitting unit 35 of the light pen 3 emits light. In FIG. 5, the horizontal axis is the time axis, and the vertical axis represents each operation state.

As shown in FIG. 5, the image pickup unit 15 of the projector 1 repeats image pickup on a predetermined cycle (for example, on a cycle of about 9.4 milliseconds). If the cycle of image pickup is called a "phase", the projector 1 and the light pen 3 repeat similar operations every reference period made up of four phases, that is, a first phase P1, a second phase P2, a third phase P3, and a fourth phase P4.

The first phase P1 is a phase for synchronization. In the first phase P1, the synchronization signal transmission unit 14 of the projector 1 causes the light emitting unit 14a to emit light and thus transmits the synchronization signal Sync to the light pen 3. The image pickup unit 15 of the projector 1 performs image pickup during a predetermined image pickup period Tc in each of the phases P1 to P4, synchronously with the synchronization signal Sync.

When the synchronization signal receiving unit 32 of the light pen 3 receives the synchronization signal Sync in the first phase P1, the control unit 30 of the light pen 3 causes the light emitting unit 35 to emit light at the timing synchronized with the received synchronization signal Sync. Specifically, the control unit 30 causes the light emitting unit 35 to emit light during the image pickup period Tc of the image pickup unit 15 so that the image pickup unit 15 picks up an image of the light emitted from the light emitting unit 35.

During the image pickup period Tc in the second phase P2 and the fourth phase P4, of the four phases P1 to P4, the control unit 30 causes the light emitting unit 35 to emit light without exception. During the image pickup period Tc in the first phase P1 and the third phase P3, the control unit 30 causes the light emitting unit 35 to emit light or not to emit light, based on the state of the distal end switch 33 and the side switch 34 (whether the switch is pressed or not). The control unit 30 notifies the projector 1 of the state of the distal end switch 33 and the state of the side switch 34, based on the transition of the light emission state (hereinafter referred to as a "light emission sequence") of the light emitting unit 35 in the first phase P1 and the third phase P3 over a plurality of reference periods. An image of the light emitted from the light emitting unit 35 of the light pen 3 during the image pickup period Tc is picked up by the image pickup unit 15 of the projector 1.

Figure 6:
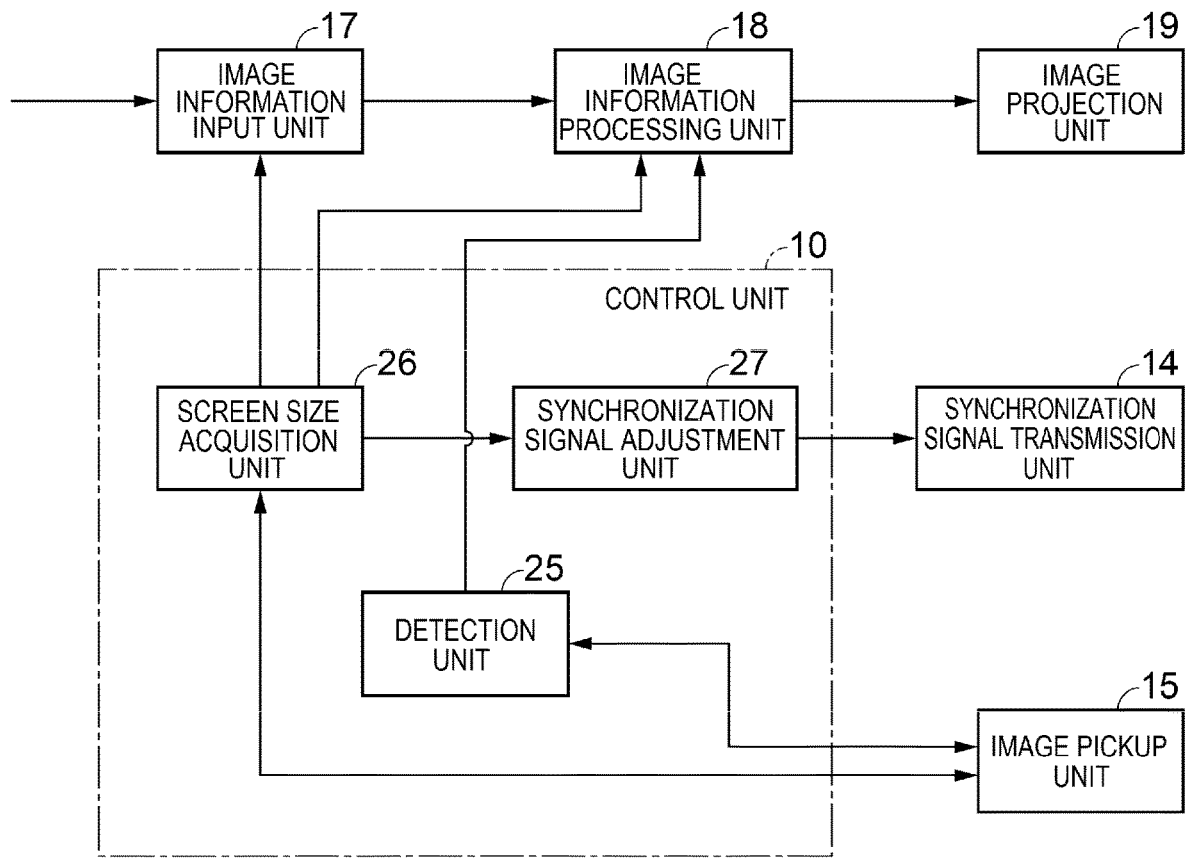
FIG. 6 is a block diagram showing a schematic configuration of a control unit of the projector.

FIG. 6 is a block diagram showing a schematic configuration of the control unit 10 of the projector 1. The control unit 10 has a detection unit 25, a screen size acquisition unit 26, and a synchronization signal adjustment unit 27, as functional blocks implemented by the control program.

The detection unit 25 detects light emitted from the light pen 3, based on an image picked up by the image pickup unit 15. Specifically, the detection unit 25 detects the position (pointed position) of the light pen 3, based on the position of infrared light whose image is picked up in the second phase P2 and the fourth phase P4. The detection unit 25 also recognizes the state of the distal end switch 33 and the side switch 34 of the light pen 3, based on the light emission sequence of infrared light whose image is picked up in the first phase P1 and the third phase P3. The detection unit 25 then controls the image information processing unit 18, based on the detected pointed position and state of the light pen 3, so as to perform processing to display a pointer or a drawn image in a superimposed manner.

The screen size acquisition unit 26 acquires the screen size of the projection image Ip projected on the projection surface Sp. The screen size is expressed, for example, by the length of a diagonal line of the rectangular projection image Ip. However, any other indicator that indicates the size of the projection image Ip may be employed. Specifically, the screen size acquisition unit 26 controls the image information input unit 17 and the image information processing unit 18 and thus causes the image projection unit 19 to project a pattern image for distance measurement (not illustrated) onto the projection surface Sp. More specifically, the screen size acquisition unit 26 reads out image information corresponding to the pattern image from the storage unit 11, outputs this image information to the image information input unit 17, and causes the image information processing unit 18 to stop various kinds of processing currently being executed. The screen size acquisition unit 26 then temporarily withdraws the infrared transmission filter of the image pickup unit 15 from the optical path and causes the image pickup unit 15 to pickup the pattern image projected on the projection surface Sp. The pattern image includes a plurality of reference points. The screen size acquisition unit 26 derives the distance between the projector 1 and the projection surface Sp (hereinafter referred to as a "projection distance"), based on the original positional relation between the individual reference points and the positional relation between the individual reference points in the picked-up image. The screen size acquisition unit 26 then calculates the screen size, based on the derived projection distance.

If the image projection unit 19 has a zoom function, the screen size changes, depending on the projection distance and the zoom state. Therefore, in this case, the screen size acquisition unit 26 calculates the screen size, based on the projection distance and the zoom state. The method for deriving the projection distance is not limited to the above. The projector 1 may be provided with a distance sensor and may measure the projection distance by the distance sensor.

Alternatively, the user may input the projection distance via the input operation unit 12. The method for acquiring the screen size is not limited to the calculation based on the projection distance. The user may input the screen size via the input operation unit 12.

The synchronization signal adjustment unit 27 adjusts the intensity of the synchronization signal Sync transmitted from the synchronization signal transmission unit 14, that is, the light emission intensity of infrared light, based on the screen size acquired by the screen size acquisition unit 26. Specifically, the synchronization signal adjustment unit 27 changes the amount of current supplied to the light emitting unit 14a of the synchronization signal transmission unit 14 and thus adjusts the light emission intensity of the synchronization signal Sync.

Figure 7:
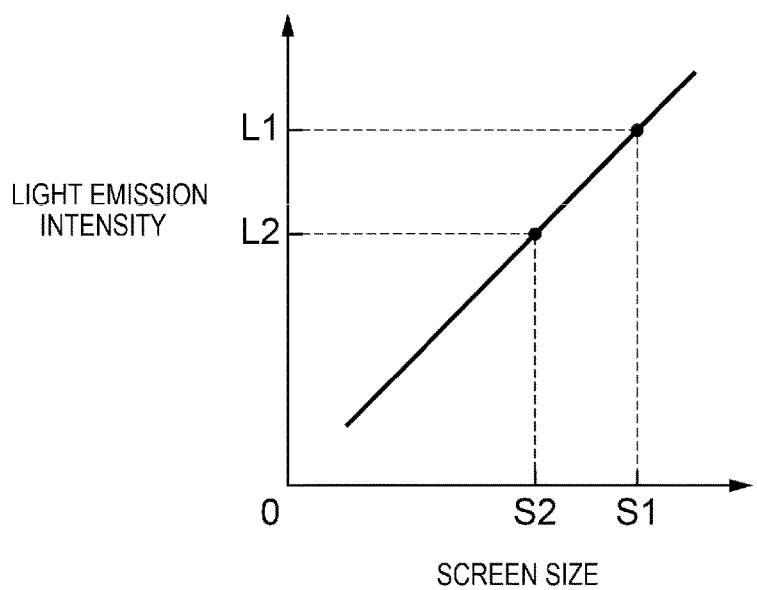
FIG. 7 is a graph showing the relation between the screen size and the light emission intensity of the synchronization signal.
Figure 8:
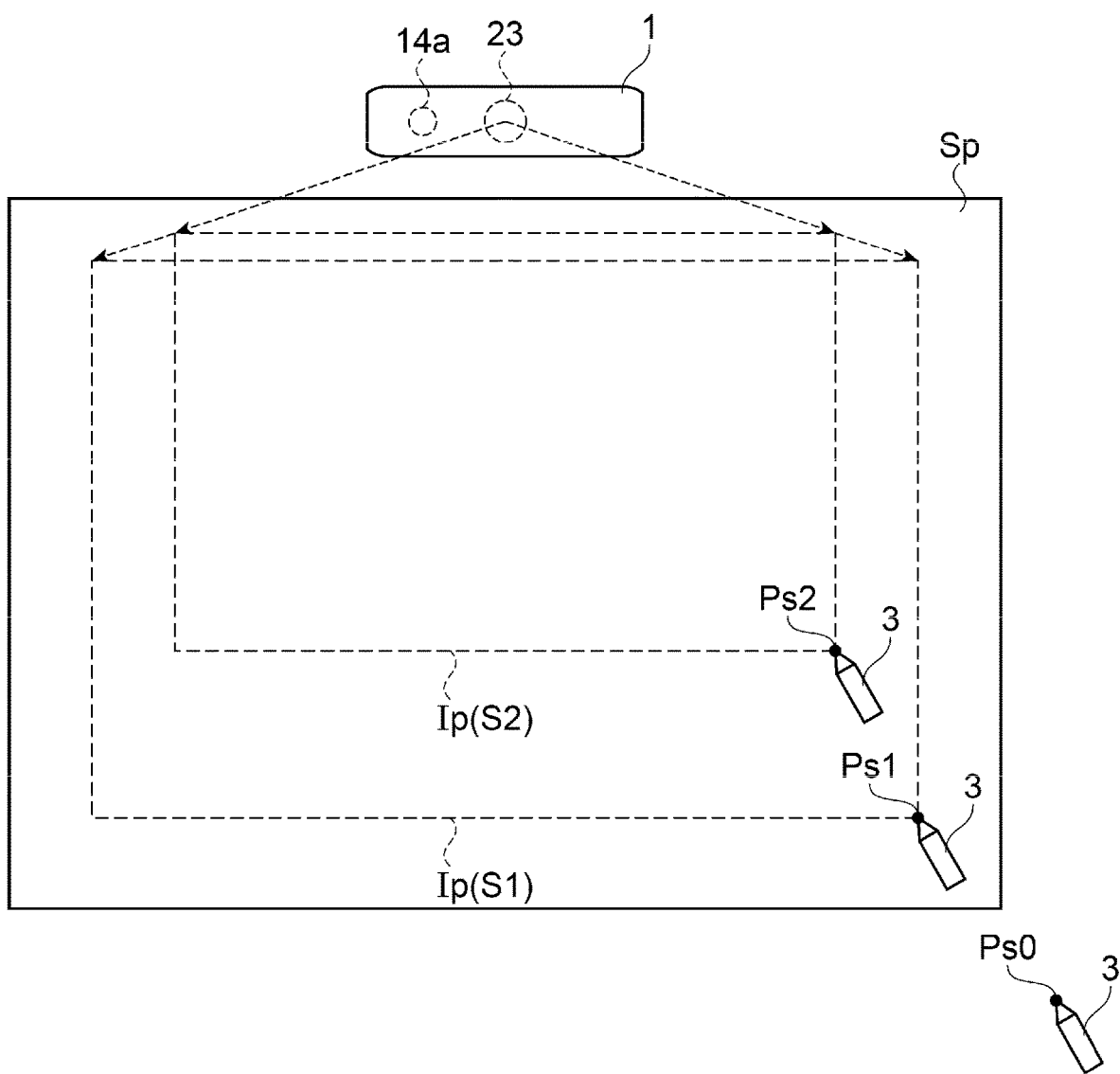
FIG. 8 is a front view showing a projection surface as viewed from the front.

FIG. 7 is a graph showing the relation between the screen size and the light emission intensity of the synchronization signal Sync. FIG. 8 is a front view showing the projection surface Sp as viewed from the front. In FIG. 7, the horizontal axis represents the screen size, and the vertical axis represents the light emission intensity of the synchronization signal Sync.

As shown in FIG. 7, the synchronization signal adjustment unit 27 makes the light emission intensity of the synchronization signal Sync lower as the screen size acquired by the screen size acquisition unit 26 becomes smaller. That is, assuming that the synchronization signal adjustment unit 27 adjusts the light emission intensity of the synchronization signal Sync to a first intensity L1 if the screen size acquired by the screen size acquisition unit 26 is a first size S1, the synchronization signal adjustment unit 27 adjusts the light emission intensity of the synchronization signal Sync to a second intensity L2 which is lower than the first intensity L1 if the acquired screen size is a second size S2 which is smaller than the first size S1.

The way the synchronization signal adjustment unit 27 changes the light emission intensity of the synchronization signal Sync is not limited to the linear change corresponding to the screen size. The synchronization signal adjustment unit 27 may change the light emission intensity stepwise. Therefore, for example, if the light emitting unit 14a of the synchronization signal transmission unit 14 has a plurality of LEDs, the number of LEDs to be turned on may be changed according to the screen size, thus adjusting the light emission intensity.

The synchronization signal Sync (infrared light) emitted from the light emitting unit 14a of the synchronization signal transmission unit 14 is attenuated with propagation. Therefore, at a position away from the light emitting unit 14a by a predetermined distance or longer, the light pen 3 does not recognize the synchronization signal Sync as it is. In other words, at a position away from the light emitting unit 14a by a predetermined distance or longer, the light pen 3 cannot receive the synchronization signal Sync.

The synchronization signal adjustment unit 27 adjusts the light emission intensity of the synchronization signal Sync in such a way that the light pen 3 can receive the synchronization signal Sync if the light pen 3 is within the range of the projection image Ip and that the light pen 3 cannot receive the synchronization signal Sync if the light pen 3 is sufficiently away from the projection image Ip. That is, even if the light pen 3 is located at a most distant position (farthest position) from the light emitting unit 14a of the synchronization signal transmission unit 14, of the range corresponding to the acquired screen size, the synchronization signal receiving unit 32 of the light pen 3 can receive the synchronization signal Sync. Meanwhile, at a position farther than the farthest position, the synchronization signal receiving unit 32 of the light pen 3 cannot receive the synchronization signal Sync.

For example, as shown in FIG. 7, if the projection image Ip is projected with the first size S1 on the projection surface Sp, the light emitting unit 14a of the synchronization signal transmission unit 14 emits the synchronization signal Sync with the first intensity L1. This light emission intensity is such that the synchronization signal receiving unit 32 can receive the synchronization signal Sync if the light pen 3 is located within the range of the first size S1. That is, even if the light pen 3 is located at a farthest position Ps1 from the light emitting unit 14a in the first size S1, as shown in FIG. 8, the light pen 3 can receive the synchronization signal Sync. However, if the light pen 3 is located at a position Ps0, which is sufficiently farther from the light emitting unit 14a than the position Ps1, the light pen 3 cannot receive the synchronization signal Sync due to insufficient light emission intensity.

Similarly, as shown in FIG. 7, if the projection image Ip is projected with the second size S2, which is smaller than the first size S1, on the projection surface Sp, the light emitting unit 14a of the synchronization signal transmission unit 14 emits the synchronization signal Sync with the second intensity L2, which is lower than the first intensity L1. This light emission intensity is such that the synchronization signal receiving unit 32 can receive the synchronization signal Sync if the light pen 3 is located within the range of the second size S2. That is, even if the light pen 3 is located at a farthest position Ps2 from the light emitting unit 14a in the second size S2, as shown in FIG. 8, the light pen 3 can receive the synchronization signal Sync. However, if the light pen 3 is located at the positions Ps0, Ps1, which are sufficiently farther from the light emitting unit 14a than the position Ps2, the light pen 3 cannot receive the synchronization signal Sync due to insufficient light emission intensity. In this way, the synchronization signal adjustment unit 27 changes the light emission intensity of the synchronization signal Sync, that is, the reachable range of the synchronization signal Sync, according to the screen size acquired by the screen size acquisition unit 26.

When the synchronization signal receiving unit 32 receives the synchronization signal Sync, the control unit 30 of the light pen 3 causes the light emitting unit 35 to emit light synchronously with the synchronization signal Sync. However, if the state where the synchronization signal Sync is not received continues, the control unit 30 does not cause the light emitting unit 35 to emit light. Therefore, the light pen 3 located at the position Ps1 emits light if the screen size of the projection image Ip is the first size S1, whereas the light pen 3 located at the position Ps1 does not emit light if the screen size of the projection image Ip is the second size S2. That is, if the screen size is relatively small, the reachable range of the synchronization signal Sync, that is, the range over which the light pen 3 emits light, is narrower than in the case where the screen size is relatively large. Therefore, power consumption by the light pen 3 is reduced.

Figure 9:
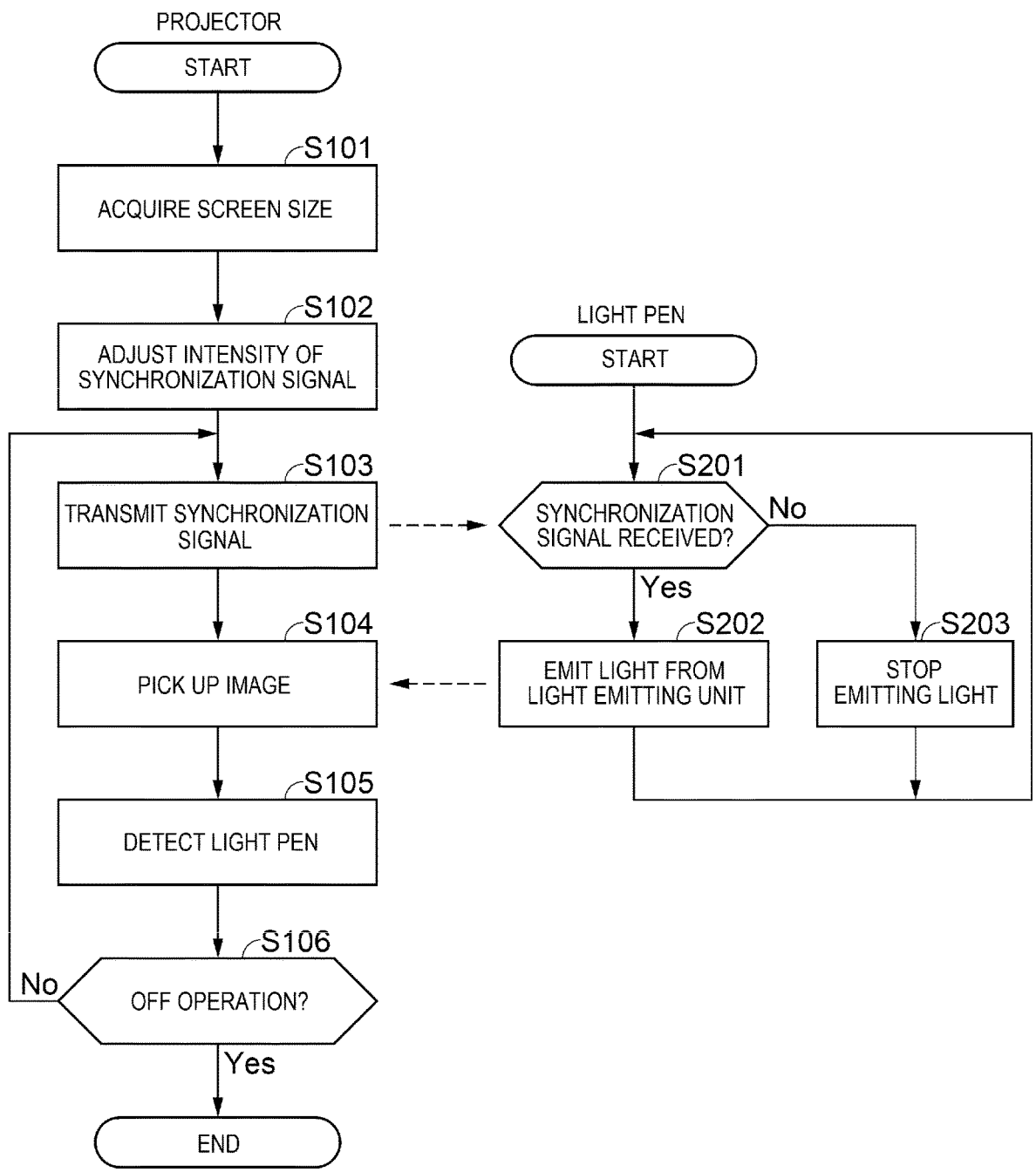
FIG. 9 is a flowchart for explaining operations of the image projection system.

FIG. 9 is a flowchart for explaining operations of the image projection system 100. When the power is turned on respectively in the projector 1 and the light pen 3, the projector 1 and the light pen 3 operate according to the flow shown in FIG. 9. As shown in FIG. 9, in step S101, the screen size acquisition unit 26 of the projector 1 acquires the screen size of the projection image Ip. In step S102, the synchronization signal adjustment unit 27 adjusts the light emission intensity of the synchronization signal Sync according to the acquired screen size. In step S103, the control unit 10 causes the synchronization signal transmission unit 14 to transmit the synchronization signal Sync with the adjusted light emission intensity.

In step S201, the control unit 30 of the light pen 3 determines whether the synchronization signal receiving unit 32 has received the synchronization signal Sync or not. If the synchronization signal receiving unit 32 has received the synchronization signal Sync, the control unit 30 in step S202 causes the light emitting unit 35 to emit light synchronously with the received synchronization signal Sync, and returns to step S201. As long as the reception of the synchronization signal Sync continues, the control unit 30 repeatedly causes the light emitting unit 35 to emit light. Meanwhile, if the reception of the synchronization signal Sync is stopped and the state where the synchronization signal Sync is not received continues for a predetermined time, the control unit 30 in step S203 causes the light emitting unit 35 to stop emitting light, and returns to step S201. The control unit 30 then maintains the state where the light emission is stopped, until the reception of the synchronization signal Sync starts.

In step S104, the control unit 10 of the projector 1 causes the image pickup unit 15 to perform image pickup at the timing synchronized with the synchronization signal Sync. In step S105, the detection unit 25 detects the pointed position of the light pen 3, based on the image picked up by the image pickup unit 15, and also detects the state of the distal end switch 33 and the side switch 34, and performs processing corresponding to the result of the detection.

In step S106, the control unit 10 determines whether an operation of giving an instruction to end the operation (off operation) by the user has carried out via the input operation unit 12 or not. If the off operation has not been carried out, the processing returns to step S103. If the off operation has been carried out, the flow ends.

As described above, the image projection system 100, the projector 1, and the method for controlling these according to this embodiment can achieve the following effects.

(1) In this embodiment, when the screen size is relatively small, the synchronization signal adjustment unit 27 reduces the intensity of the synchronization signal Sync and this restrains the light pen 3 from receiving the synchronization signal Sync despite being sufficiently away from the projection image Ip. Therefore, it is possible to restrain unwanted power consumption due to light emission of the light pen 3 at a position away from the projection image Ip. This can prolong the time taken until the replacement or recharging of the battery 37 and reduce the number of times of replacement or recharging, and therefore improve convenience for the user.

(2) In this embodiment, the screen size acquisition unit 26 causes the image projection unit 19 to project a pattern image for distance measurement, causes the image pickup unit 15 to pick up the projected pattern image, and calculates the screen size, based on the picked-up pattern image. Therefore, it is possible to acquire the screen size easily.

Second Embodiment

Hereinafter, an image projection system according to a second embodiment will be described with reference to the drawings. The image projection system 100 according to this embodiment has the characteristics described in the first embodiment and also has the function of adjusting the amount of light emitted from the light pen 3.

Figure 10:
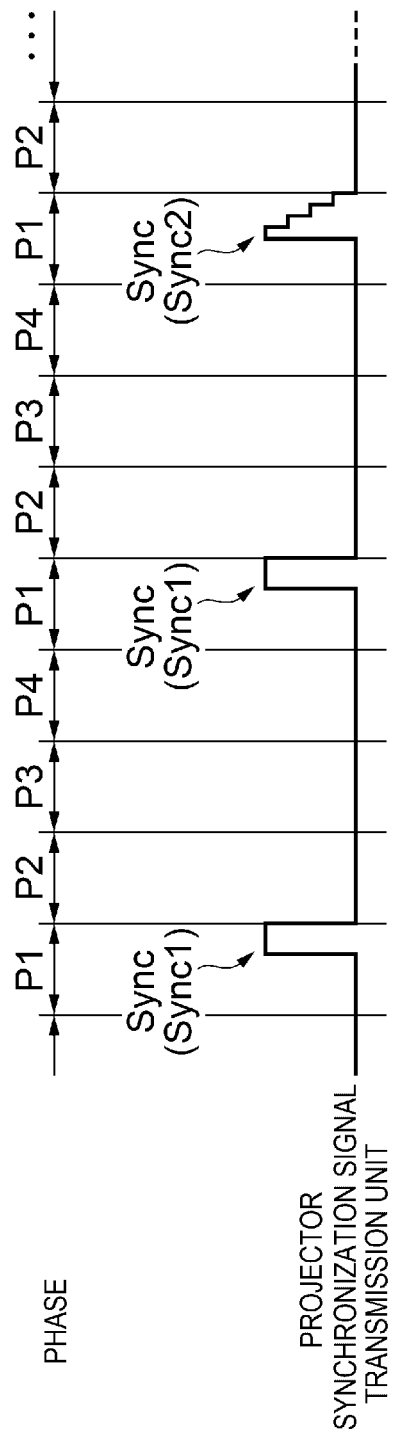
FIG. 10 is a timing chart showing a synchronization signal emitted from a projector according to a second embodiment.
Figure 11:
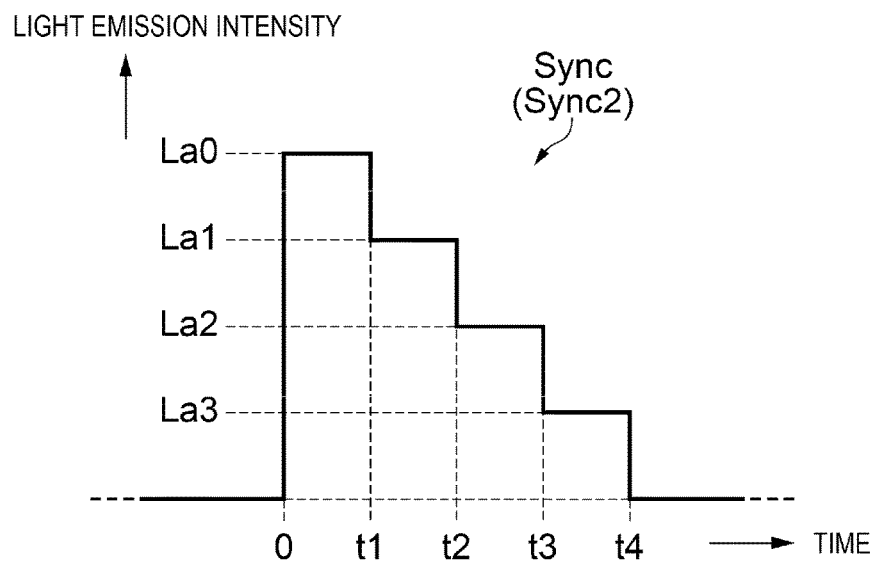
FIG. 11 shows the waveform of the synchronization signal according to the second embodiment.

FIG. 10 is a timing chart showing the synchronization signal Sync transmitted from the projector 1 according to the second embodiment. FIG. 11 shows the waveform of the synchronization signal Sync according to the second embodiment. In FIGS. 10 and 11, the horizontal axis is the time axis, and the vertical axis represents the light emission intensity of the light emitting unit 14a.

As shown in FIG. 10, the synchronization signal transmission unit 14 of the projector 1 in this embodiment transmits the synchronization signal Sync with the light emission intensity adjusted by the synchronization signal adjustment unit 27, as in the first embodiment, but periodically (for example, once every 32 phases) transmits a synchronization signal Sync (hereinafter referred to as a "second synchronization signal Sync2") having a different waveform from the normal synchronization signal Sync (hereinafter referred to as a "first synchronization signal Sync1"). Specifically, the second synchronization signal Sync2 is transmitted with a waveform such that the light emission intensity decreases stepwise with the lapse of time.

As shown in FIG. 11, if the synchronization signal adjustment unit 27 adjusts the light emission intensity of the synchronization signal Sync to La0, the synchronization signal transmission unit 14 sets the light emission intensity of the second synchronization signal Sync2 to La0 until a time t1 passes from the rise-up of the second synchronization signal Sync2, and reduces the light emission intensity to La1 after the lapse of the time t1. Subsequently, the synchronization signal transmission unit 14 reduces the light emission intensity to La2, La3 with the lapse of times t2, t3. After the lapse of a time t4, the synchronization signal transmission unit 14 reduces the light emission intensity to 0.

If the light pen 3 is close enough to the projector 1 to recognize a signal transmitted with the light emission intensity La3 from the projector 1, the light pen 3 recognizes the second synchronization signal Sync2 as a signal having approximately the duration of t4. Meanwhile, if the light pen 3 is located at a position where the light pen 3 cannot recognize a signal transmitted with the light emission intensity La3 but can recognize a signal transmitted with the light emission intensity La2, the light pen 3 recognizes the second synchronization signal Sync2 as a signal having approximately the duration of t3. Similarly, if the light pen 3 is located at a position where the light pen 3 cannot recognize a signal transmitted with the light emission intensity La2 but can recognize a signal transmitted with the light emission intensity La1, the light pen 3 recognizes the second synchronization signal Sync2 as a signal having approximately the duration of t2. If the light pen 3 is too far from the projector 1 to recognize a signal transmitted with the light emission intensity La1, the light pen 3 recognizes the second synchronization signal Sync2 as a signal having approximately the duration of t1.

In this way, the duration of the second synchronization signal Sync2 recognized by the light pen 3 varies depending on the distance between the light pen 3 and the projector 1. The control unit 30 of the light pen 3 adjusts the amount of light emitted from the light emitting unit 35 according to the duration of the recognized second synchronization signal Sync2.

Figure 12:
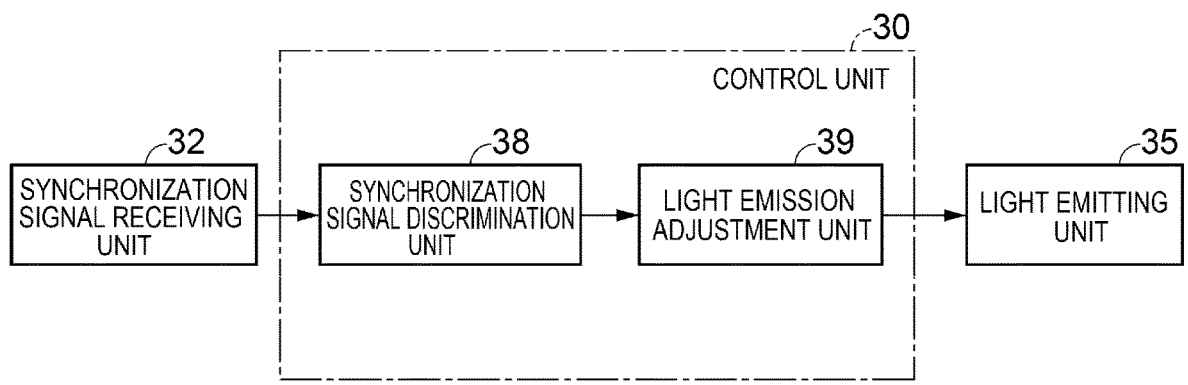
FIG. 12 is a block diagram showing a schematic configuration of a control unit of a light pen according to the second embodiment.

FIG. 12 is a block diagram showing a schematic configuration of the control unit 30 of the light pen 3 according to the second embodiment. The control unit 30 has a synchronization signal discrimination unit 38 and a light emission adjustment unit 39, as functional blocks implemented by the control program.

As shown in FIG. 12, the synchronization signal discrimination unit 38 determines which of t1 to t4 the duration of the recognized second synchronization signal Sync2 is, of the synchronization signals Sync received by the synchronization signal receiving unit 32.

The light emission adjustment unit 39 adjusts the amount of light emitted from the light emitting unit 35, based on the duration of the second synchronization signal Sync2 determined by the synchronization signal discrimination unit 38. Specifically, the light emission adjustment unit 39 adjusts the amount of light emitted, by changing the amount of current supplied to the LED of the light emitting unit 35, that is, by changing the light emission intensity of the light emitting unit 35.

Figure 13:
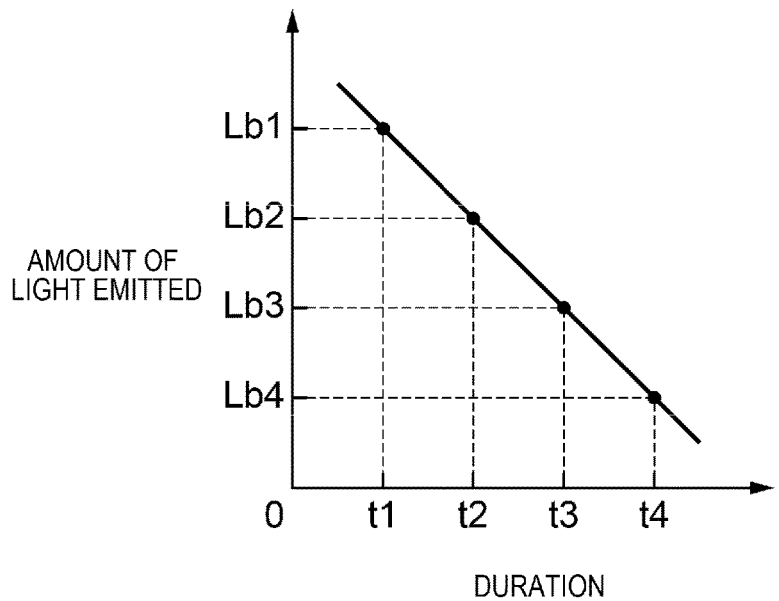
FIG. 13 is a graph showing the relation between the duration of a second synchronization signal recognized by the light pen and the amount of light emitted from the light emitting unit.

FIG. 13 is a graph showing the relation between the duration of the second synchronization signal Sync2 recognized by the light pen 3 and the amount of light emitted from the light emitting unit 35. As shown in FIG. 13, the light emission adjustment unit 39 makes the amount of light emitted from the light emitting unit 35 smaller as the duration of the recognized second synchronization signal Sync2 becomes longer. That is, assuming that the light emission adjustment unit 39 adjusts the amount of light emitted from the light emitting unit 35 to Lb1 if the duration of the second synchronization signal Sync2 determined by the synchronization signal discrimination unit 38 is t1, the light emission adjustment unit 39 adjusts the amount of light emitted from the light emitting unit 35 to Lb2 which is smaller than Lb1. Similarly, as the duration of the second synchronization signal Sync2 becomes longer to t3, t4, the amount of light emitted from the light emitting unit 35 becomes smaller to Lb3, Lb4.

As the light pen 3 is located nearer to the projector 1 (light emitting unit 14a), the light pen 3 can recognize a signal transmitted with a lower light emission intensity from the projector 1 and recognizes the duration of the second synchronization signal Sync2 as being longer. If the light pen 3 is located near the projector 1, an image of the light emitted from the light emitting unit 35 can be picked up with a sufficient brightness by the image pickup unit 15 even if the amount of light emitted is small. Therefore, by making the amount of light emitted from the light emitting unit 35 smaller as the duration of the recognized second synchronization signal Sync2 becomes longer, it is possible to reduce the power consumption by the light pen 3 without affecting the detection of the light pen 3. That is, compared with the related-art technique, the power consumption by the light pen 3 can be reduced while the accuracy of detection of the pointed position is maintained.

Figure 14:
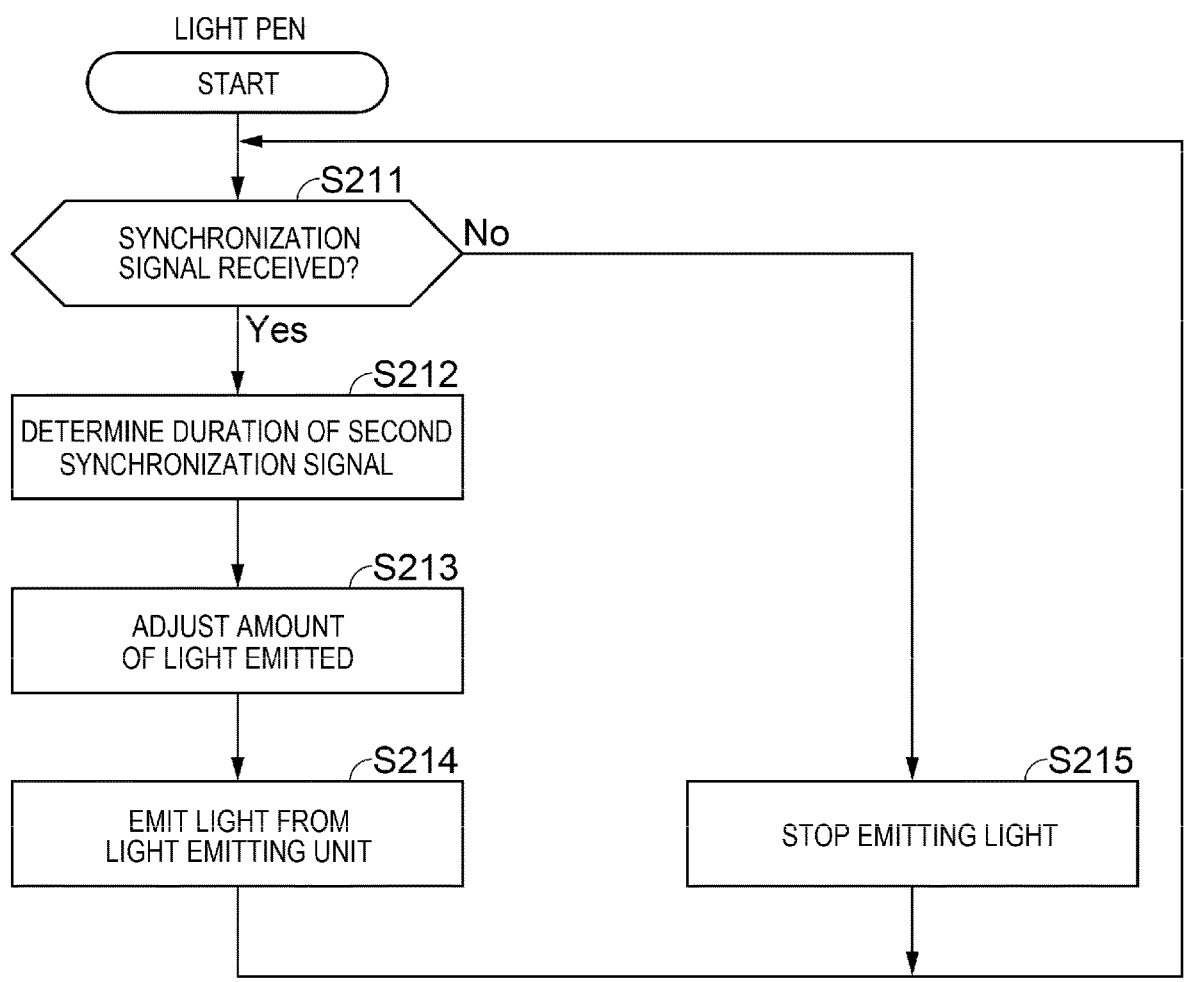
FIG. 14 is a flowchart showing operations of the light pen according to the second embodiment.

FIG. 14 is a flowchart showing operations of the light pen 3 according to the second embodiment. As shown in FIG. 14, if the synchronization signal receiving unit 32 receives the synchronization signal Sync transmitted from the projector 1 (Yes in step S211), the synchronization signal discrimination unit 38 determines which of t1 to t4 the duration of the second synchronization signal Sync2 is, of the synchronization signals Sync received by the synchronization signal receiving unit 32 (step S212). The light emission adjustment unit 39 adjusts the amount of light emitted from the light emitting unit 35, based on the duration of the second synchronization signal Sync2 determined by the synchronization signal discrimination unit 38 (step S213). The control unit 30 causes the light emitting unit 35 to emit light in the adjusted amount of light emitted, at a timing based on the first synchronization signal Sync1 (step S214). Meanwhile, if the reception of the second synchronization signal Sync2 is stopped and the state where the synchronization signal Sync is not received continues for a predetermined time (No in step S211), the control unit 30 causes the light emitting unit 35 to stop emitting light in step S215.

As described above, the image projection system 100, the projector 1, and the method for controlling these according to this embodiment can achieve the following effects in addition to the effects of the first embodiment.

(1) In this embodiment, the light emission adjustment unit 39 adjusts the amount of light emitted from the light emitting unit 35, based on the result of reception of the second synchronization signal Sync2 transmitted periodically from the projector 1. Therefore, the power consumption by the light pen 3 can be restrained further.

(2) In this embodiment, the second synchronization signal Sync2 is a signal whose intensity decreases with the lapse of time, and the amount of light emitted from the light emitting unit 35 is made smaller as the duration of the second synchronization signal Sync2 received by the synchronization signal receiving unit 32 becomes longer, that is, as the light pen 3 becomes closer to the projector 1. Therefore, it is possible to restrain the power consumption in the case where the light pen 3 is located relatively near the projector 1 and therefore does not need a large amount of light emitted.

Modifications

The embodiments may be modified as follows.

In the first embodiment, the screen size acquisition unit 26 acquires the screen size when the power is turned on in the projector 1. However, the screen size need not be acquired every time the power is turned on. For example, the screen size may be acquired, based on an instruction by the user or the like when the projector 1 is installed.

In the second embodiment, the second synchronization signal Sync2 has a waveform such that the amount of light emitted decreases stepwise with the lapse of time. However, the second synchronization signal Sync2 may have a waveform such that the amount of light emitted decreases linearly with the lapse of time.

Figure 15:
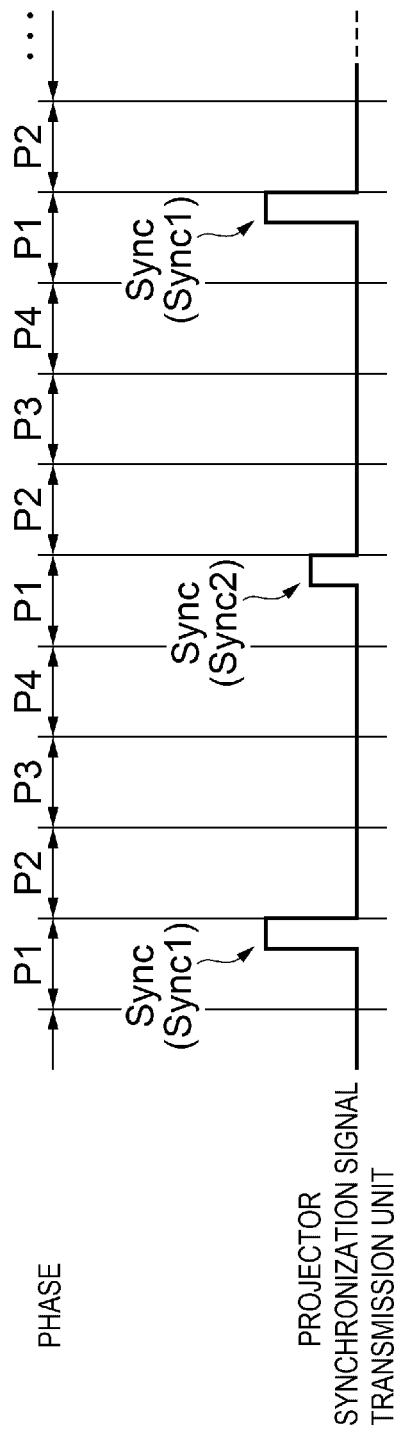
FIG. 15 is a timing chart showing a synchronization signal emitted from a projector according to a modification.

In the second embodiment, the waveform of the second synchronization signal Sync2 is not limited to the waveform shown in FIG. 10. For example, as shown in FIG. 15, the waveform of the second synchronization signal Sync2 may be such that the light emission intensity is simply lower than with the first synchronization signal Sync1. With this configuration, the second synchronization signal Sync2 is received by the light pen 3 if the distance between the light pen 3 and the projector (light emitting unit 14a) is a predetermined distance or shorter, whereas the second synchronization signal Sync2 is not received by the light pen 3 if the distance between the light pen 3 and the projector 1 is longer than the predetermined distance. Therefore, if the light pen 3 successfully receives the second synchronization signal Sync2, the amount of light emitted from the light emitting unit 35 is made smaller than in the case where the light pen 3 cannot receive the second synchronization signal Sync2, and this makes it possible to reduce the power consumption by the light pen 3 without affecting the detection of the light pen 3. In this case, the synchronization signal discrimination unit 38 determines whether the second synchronization signal Sync2 has been successfully received or not. Based on the result of the determination, the light emission adjustment unit 39 adjusts the amount of light emitted from the light emitting unit 35. Also, even if the light pen 3 cannot receive the second synchronization signal Sync2, the light pen 3 can continue the light emission from the light emitting unit 35, based on the first synchronization signal Sync1, which is repeatedly received.

In the second embodiment, the amount of light emitted from the light emitting unit 35 is adjusted by changing the amount of current, that is, by changing the light emission intensity. However, the adjustment of the amount of light emitted is not limited to this configuration. For example, the amount of light emitted may be adjusted by changing the light emission time of the light emitting unit 35 within the image pickup period Tc.

In the embodiments, the transmission-type liquid crystal light valves 22R, 22G, 22B are used as light modulation devices. However, a reflection-type light modulation device such as a reflection-type liquid crystal light valve can be used. Also, a digital mirror device or the like which controls the exit direction of incident light for each micromirror as a pixel so as to modulate light emitted from the light source 21 may be used. Moreover, the configuration having a plurality of light modulation devices corresponding to individual color light components is not limiting. A single light modulation device may modulate a plurality of color light components in time division.

Contents derived from the embodiments will be described below.

An image projection system includes a projector and a pointing element. The projector includes: an image projection unit which projects an image; an image pickup unit; a detection unit which detects a pointed position of the pointing element, based on an image picked up by the image pickup unit; a synchronization signal transmission unit which transmits a synchronization signal to the pointing element; a screen size acquisition unit which acquires a screen size of the image projected from the image projection unit; and a synchronization signal adjustment unit which sets an intensity of the synchronization signal to a first intensity if the acquired screen size is a first size and which sets the intensity of the synchronization signal to a second intensity that is lower than the first intensity if the acquired screen size is a second size that is smaller than the first size. The pointing element includes: a light emitting unit; a synchronization signal receiving unit which receives the synchronization signal; and a control unit which controls light emission of the light emitting unit, based on the synchronization signal received by the synchronization signal receiving unit.

In this configuration, the synchronization signal adjustment unit reduces the intensity of the synchronization signal if the screen size is relatively small. Therefore, the pointing element is restrained from receiving the synchronization signal despite being sufficiently away from the projection image. This makes it possible to restrain unwanted power consumption due to the pointing element emitting light at a position away from the projection image.

In the image projection system, it is desirable that the screen size acquisition unit causes the image projection unit to project a predetermined pattern image, causes the image pickup unit to pick up the projected pattern image, and calculates the screen size, based on the picked-up pattern image.

In this configuration, the screen size is calculated, based on the image obtained by picking up the pattern image. Thus, the screen size can be acquired easily.

In the image projection system, it is desirable that the synchronization signal transmission unit periodically transmits a first synchronization signal having an intensity adjusted by the synchronization signal adjustment unit and a second synchronization signal having an intensity lower than that of the first synchronization signal, and that the control unit causes the light emitting unit to emit light, based on the first synchronization signal received by the synchronization signal receiving unit, and adjusts an amount of light emitted from the light emitting unit, based on a result of reception of the second synchronization signal by the synchronization signal receiving unit.

In this configuration, the control unit of the pointing element adjusts the amount of light emitted from the light emitting unit, based on the result of reception of the second synchronization signal transmitted periodically from the projector. Thus, the power consumption by the pointing element can be restrained further.

In the image projection system, it is desirable that if the synchronization signal receiving unit receives the second synchronization signal, the control unit reduces the amount of light emitted from the light emitting unit to less than the amount of light emitted where the synchronization signal receiving unit does not receive the second synchronization signal.

In this configuration, if the pointing element successfully receives the second synchronization signal, that is, if the pointing element is located relatively near the projector, the amount of light emitted from the light emitting unit is reduced. Thus, it is possible to restrain the power consumption in the case where the pointing element is located relatively near the projector and therefore does not need a large amount of light emitted.

In the image projection system, it is desirable that the second synchronization signal is a signal with an intensity decreasing with the lapse of time, and that the control unit makes the amount of light emitted from the light emitting unit smaller as a duration of the second synchronization signal received by the synchronization signal receiving unit becomes longer.

In this configuration, the amount of light emitted from the light emitting unit is made smaller as the duration of the second synchronization signal received by the pointing element becomes longer, that is, as the pointing element becomes closer to the projector. Thus, it is possible to restrain the power consumption in the case where the pointing element is located relatively near the projector and therefore does not need a large amount of light emitted.

A projector includes: an image projection unit which projects an image; an image pickup unit; a detection unit which detects a pointed position of a pointing element, based on an image picked up by the image pickup unit; a synchronization signal transmission unit which transmits a synchronization signal to the pointing element; a screen size acquisition unit which acquires a screen size of the image projected from the image projection unit; and a synchronization signal adjustment unit which sets an intensity of the synchronization signal to a first intensity if the acquired screen size is a first size and which sets the intensity of the synchronization signal to a second intensity that is lower than the first intensity if the acquired screen size is a second size that is smaller than the first size.

In this projector, the synchronization signal adjustment unit reduces the intensity of the synchronization signal if the screen size is relatively small. Therefore, the pointing element is restrained from receiving the synchronization signal despite being sufficiently away from the projection image. This makes it possible to restrain unwanted power consumption due to the pointing element emitting light at a position away from the projection image.

A method for controlling an image projection system is for an image projection system including a projector which projects an image and a pointing element having a light emitting unit. The method includes: causing the projector to acquire a screen size of the projected image, to transmit a synchronization signal with a first intensity to the pointing element if the acquired screen size is a first size, and to transmit the synchronization signal with a second intensity that is lower than the first intensity if the acquired screen size is a second size that is smaller than the first size; and causing the pointing element to receive the synchronization signal and to cause the light emitting unit to emit light, based on the received synchronization signal; and causing the projector to pick up an image of the light emitted from the light emitting unit and to detect a pointed position of the pointing element.

In this method for controlling the image projection system, the intensity of the synchronization signal is reduced if the screen size is relatively small. Therefore, the pointing element is restrained from receiving the synchronization signal despite being sufficiently away from the projection image. This makes it possible to restrain unwanted power consumption due to the pointing element emitting light at a position away from the projection image.

The entire disclosures of Japanese patent application no. JP 2018-045074 filed on Mar. 13, 2018 is expressly incorporated by reference herein.

What is claimed is:

1. An image projection system comprising:
a projector; and
a pointing element, wherein
the projector includes
an image projection unit which projects an image;
an image pickup unit;
a detection unit which detects a pointed position of the pointing element, based on an image picked up by the image pickup unit;
a synchronization signal transmission unit which transmits a synchronization signal to the pointing element;
a screen size acquisition unit which acquires a screen size of the image projected from the image projection unit; and
a synchronization signal adjustment unit which sets an intensity of the synchronization signal to a first intensity if the acquired screen size is a first size and which sets the intensity of the synchronization signal to a second intensity that is lower than the first intensity if the acquired screen size is a second size that is smaller than the first size,
the pointing element includes
a light emitting unit;
a synchronization signal receiving unit which receives the synchronization signal; and
a control unit which controls light emission of the light emitting unit, based on the synchronization signal received by the synchronization signal receiving unit.

2. The image projection system according to claim 1, wherein
the screen size acquisition unit of the projector causes the image projection unit to project a predetermined pattern image, causes the image pickup unit to pick up the projected pattern image, and calculates the screen size, based on the picked-up pattern image.

3. The image projection system according to claim 1, wherein
the synchronization signal transmission unit of the projector periodically transmits a first synchronization signal having an intensity adjusted by the synchronization signal adjustment unit and a second synchronization signal having an intensity lower than that of the first synchronization signal, and
the control unit of the pointing element causes the light emitting unit to emit light, based on the first synchronization signal received by the synchronization signal receiving unit, and adjusts an amount of light emitted from the light emitting unit, based on a result of reception of the second synchronization signal by the synchronization signal receiving unit.

4. The image projection system according to claim 3, wherein
if the synchronization signal receiving unit receives the second synchronization signal, the control unit of the pointing element reduces the amount of light emitted from the light emitting unit to less than the amount of light emitted where the synchronization signal receiving unit does not receive the second synchronization signal.

5. The image projection system according to claim 3, wherein
the second synchronization signal is a signal with an intensity decreasing with the lapse of time, and
the control unit of the pointing element makes the amount of light emitted from the light emitting unit smaller as a duration of the second synchronization signal received by the synchronization signal receiving unit becomes longer.

6. A projector comprising:
an image projection unit which projects an image;
an image pickup unit;
a detection unit which detects a pointed position of a pointing element, based on an image picked up by the image pickup unit;
a synchronization signal transmission unit which transmits a synchronization signal to the pointing element;
a screen size acquisition unit which acquires a screen size of the image projected from the image projection unit; and
a synchronization signal adjustment unit which sets an intensity of the synchronization signal to a first intensity if the acquired screen size is a first size and which sets the intensity of the synchronization signal to a second intensity that is lower than the first intensity if the acquired screen size is a second size that is smaller than the first size.

7. The projector according to claim 6, wherein
a predetermined pattern image is projected from the image projection unit, the projected pattern image is picked up, and the screen size is calculated, based on the picked-up pattern image.

8. The projector according to claim 6, wherein
a first synchronization signal having an adjusted intensity and a second synchronization signal having an intensity lower than that of the first synchronization signal are periodically transmitted.

9. The projector according to claim 8, wherein
the second synchronization signal is a signal with an intensity decreasing with the lapse of time.

10. A method for controlling an image projection system including a projector which projects an image and a pointing element having a light emitting unit, the method comprising:
causing the projector to acquire a screen size of the projected image, to transmit a synchronization signal with a first intensity to the pointing element if the acquired screen size is a first size, and to transmit the synchronization signal with a second intensity that is lower than the first intensity if the acquired screen size is a second size that is smaller than the first size;

causing the pointing element to receive the synchronization signal and to cause the light emitting unit to emit light, based on the received synchronization signal; and causing the projector to pick up an image of the light emitted from the light emitting unit and to detect a pointed position of the pointing element.

11. The method for controlling the image projection system according to claim 10, wherein the projector causes the image projection unit to project a predetermined pattern image, picks up the projected pattern image, and calculates the screen size, based on the picked-up pattern image.

12. The method for controlling the image projection system according to claim 10, wherein the projector periodically transmits a first synchronization signal having an adjusted intensity and a second synchronization signal having an intensity lower than that of the first synchronization signal, and the pointing element causes the light emitting unit to emit light, based on the received first synchronization signal, and adjusts an amount of light emitted from the light emitting unit, based on a result of reception of the second synchronization signal.

13. The method for controlling the image projection system according to claim 12, wherein if the pointing element receives the second synchronization signal, the pointing element reduces the amount of light emitted from the light emitting unit to less than the amount of light emitted where the pointing element does not receive the second synchronization signal.

14. The method for controlling the image projection system according to claim 12, wherein the second synchronization signal is a signal with an intensity decreasing with the lapse of time, and the pointing element makes the amount of light emitted from the light emitting unit smaller as a duration of the received second synchronization signal becomes longer.

* * * * *